United States Patent [19]

Morse

[11] 4,395,108
[45] Jul. 26, 1983

[54] COLOR BALANCED SCRATCH SUPPRESSING PROJECTION APPARATUS FOR COLOR TRANSPARENCIES

[75] Inventor: John E. Morse, Rochester, N.Y.

[73] Assignee: Eastman Kodak Company, Rochester, N.Y.

[21] Appl. No.: 348,383

[22] Filed: Feb. 12, 1982

[51] Int. Cl.³ .......................... G03B 27/00; G02B 5/14
[52] U.S. Cl. ......................................... 355/1; 250/227; 350/96.31; 355/38; 358/225; 358/302
[58] Field of Search ................... 355/1, 32, 37, 38, 67, 355/71, 30; 350/96.28, 96.31; 358/225, 345, 302; 356/404–406; 250/227

[56] References Cited

U.S. PATENT DOCUMENTS

| | | | |
|---|---|---|---|
| 1,781,800 | 11/1930 | Baird | 358/225 |
| 2,947,810 | 8/1960 | Horsley | 358/345 |
| 3,170,022 | 2/1965 | Reesen | 355/38 X |
| 3,488,117 | 1/1970 | Weisglass | 355/37 |
| 3,514,200 | 5/1970 | Bowker | 355/1 |
| 3,561,867 | 2/1971 | Simmon | 355/67 |
| 3,588,246 | 6/1971 | July | 355/38 |
| 3,672,768 | 6/1972 | Schaub et al. | 355/38 |
| 3,832,028 | 8/1974 | Kapron | 350/96.31 |
| 4,017,179 | 4/1977 | Pone', Jr. | 355/38 |
| 4,023,903 | 5/1977 | Scheib | 355/71 |

FOREIGN PATENT DOCUMENTS

| | | | |
|---|---|---|---|
| 1409153 | 10/1975 | United Kingdom . | |
| 794589 | 1/1981 | U.S.S.R. | 355/38 |

OTHER PUBLICATIONS

Phillips Tech. Review, vol. 21, p. 234 "Flyng—Spot Scanners for Colour Television" by H. Van Ginkel.
Journal of the SMPTE, vol. 73, Jul. 1964 "A Review of Telecine Systems" by D. R. Morse.
Phillips Tech. Journal, vol. 24, 1962–1963, No. 9 "Colour Separation in Colour—Television Cameras" by Lange Bouwhuis.

Primary Examiner—Richard A. Wintercorn
Attorney, Agent, or Firm—Thomas H. Close

[57] ABSTRACT

A color balanced scratch suppressing projection apparatus for color transparencies includes an objective lens having a rectangular aperture and defining first and second conjugate planes. An integrating bar having a rectangular cross section and first and second end faces is located with its first end face adjacent the first conjugate plane of the objective lens. A condenser lens, disposed between the first conjugate plane and the first end face of the integrating bar forms an image of the rectangular aperture on the second end face of the bar. The linear dimensions of the image of the rectangular aperture are an even multiple of the dimensions of the second end face.

In one embodiment of the invention, the projection apparatus is a color transparency scanner, a flying spot light source such as a CRT is located at the second conjugate plane of the objective lens, and a plurality of color photosensors are located at the second end face of the integrating bar.

In an alternative embodiment, the projection apparatus is a color projection printer, a photosensitive print medium is located at the second conjugate plane of the objective lens, and a plurality of colored light sources are located at the second end of the integrating bar.

9 Claims, 11 Drawing Figures

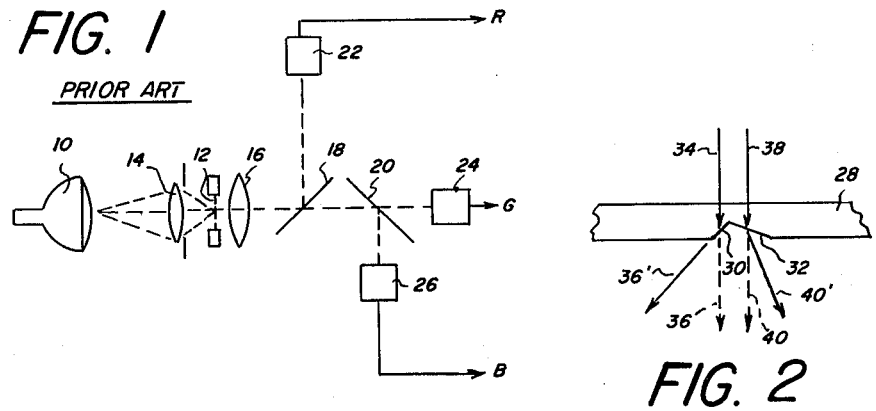
FIG. 1 PRIOR ART
FIG. 2
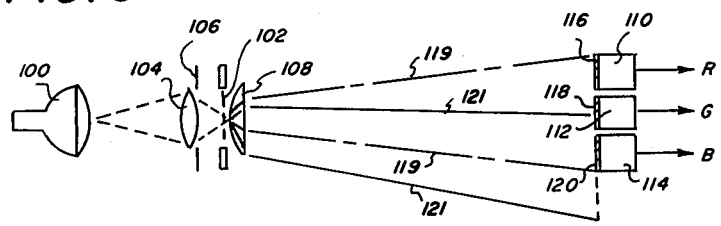
FIG. 3
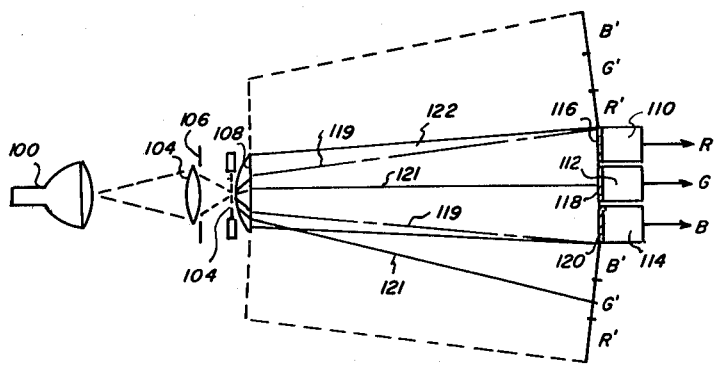
FIG. 4

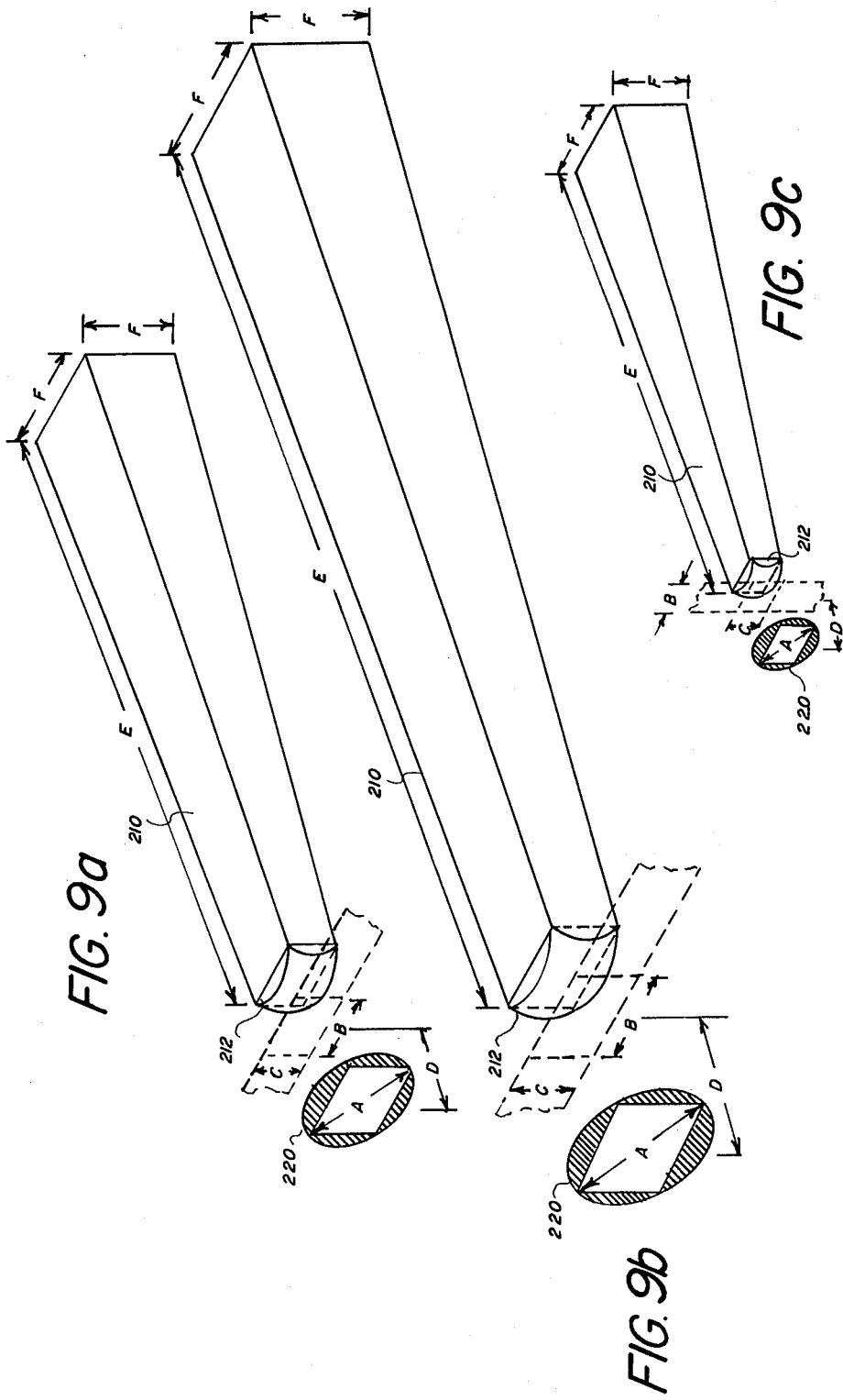

COLOR BALANCED SCRATCH SUPPRESSING PROJECTION APPARATUS FOR COLOR TRANSPARENCIES

BACKGROUND OF THE INVENTION

1. Field of the Invention

The present invention relates to optical apparatus employed to project color transparencies, and more particularly, to such optical apparatus having means for suppressing the appearance of scratches in the transparency.

2. Description of the Problem

Equipment in which color transparencies such as color slides, color negatives, or color movie film are scanned or projected, are well known. Such equipment includes graphic arts scanners, telecine and slide scanning apparatus, and photographic printers. FIG. 1 shows one example of a prior art color film scanner. In the film scanner shown in FIG. 1, a scanning raster pattern generated by a CRT 10 is imaged onto a color transparency 12 by an objective lens 14. The light emerging from the color transparency is relayed by a condenser lens 16 to a pair of dichroic mirrors 18 and 20 employed to separate the light into three primary colored beams. The respective colored beams are intercepted by three photomultiplier tubes 22, 24 and 26 to produce three additive primary color signals R, G, and B respectively.

The reflection and transmission characteristics of dichroic mirrors are a strong function of the angle of incidence of the light striking the mirrors. As a result, one of the problems with prior art scanning arrangements like that shown in FIG. 1, is that the peripheral portions of the raster exhibit a color shaft with respect to the central portion. Various approaches have been employed to correct this problem, including the use of subtractive trimming filters in front of the photomultiplier tubes, and the use of extra condenser lenses to bend the off axis beams closer to the optical axis.

Another problem encountered in prior art film scanners, as well as in projection printers, is caused by scratches in the transparency to be projected. The appearance of a scratch is amplified in the scanning or projecting process and results in a white or dark line in the resulting picture, depending upon whether the transparency is a negative or a positive. The reason for this can be appreciated from FIG. 2, which shows a partial cross section of a piece of transparent film 28, bearing a scratch with facets 30 and 32. Each facet of the scratch acts like a prism that refracts light passing through the film. For example, a ray of light 34 which would normally pass through the film, exiting along the dotted line 36, is refracted by scratch facet 30 into the direction 36'. Similarly, a ray of light 38 which would normally pass through the film and exit along dotted line 40, is refracted by scratch facet 32 into the direction 40'. Much of the light refracted in this manner by scratches escapes from the optical path of the scanning or projection printing apparatus and is never detected by the photosensors in the case of film scanners or by the photosensitive medium in the case of projection printers.

One prior art solution to this problem, in the case of projection printers, was to employ a diffuse source of illumination so that for each ray that is refracted by a scratch and escapes the optical path of the apparatus, another ray that normally would have escaped the optical path is refracted into the optical path, thereby "filling-in" for the light normally lost by the scratch. For projection printers, this solution is inefficient since much light is wasted. The method cannot be used at all in film scanners, which by their very nature require a specular rather than a diffuse source of illumination.

One prior art approach to scratch suppression that works in both projection printers and scanners is to cover the scratch with an index matching liquid in a so-called liquid gate. This method is effective but it is both messy and costly.

It has been suggested in the prior art that the appearance of scratches may be suppressed in a film scanner by photoelectronically detecting the light refracted away from the optical path by a scratch, and substituting the scanned information from the area of the scratch with the information from adjacent regions. This approach involves the use of complicated electronics and sophisticated sensing and signal processing hardware, and is not suitable for use with projection printers.

A further approach employed in both film scanners and projection printers has been to surround the optical system with reflecting surfaces, to either (1) redirect light scattered by scratches into the photosensors in the case of film scanners, or (2) to provide off-axis "fill-in" light in the case of projection printers. This approach, when used with film scanners, can result in the appearance of a properly exposed but color-shifted scratch, because the light refracted by the facets of the scratch encounters the dichroic filter in the scanner at angles different from that of the unrefracted light.

In light of the foregoing, the challenge faced by the present inventor was to provide a scratch suppressing optical projection arrangement that would avoid the problems with the prior art scratch suppressing schemes especially the problem of introducing color shifts into the suppressed scratches.

SOLUTION TO THE PROBLEM—SUMMARY OF THE INVENTION

In a film scanning apparatus, the first step in solving the problems noted above was to remove the dichroic filters from the optical arrangement and instead to "area-share" the scanning beam with a plurality of color sensors using absorptive filters which are not sensitive to the angle of incident light. FIG. 3 shows the scanning arrangement in this first step of development. A cathode ray tube 100 generates a raster pattern that is focused on film 102 by an objective lens 104. The objective lens contains a rectangular aperture 106. A condenser lens 108 images the rectangular aperture onto an array of photosensors 110, 112 and 114 rendered color sensitive by absorptive color filters 116, 118 and 120 to produce red, green and blue color signals R, G, and B respectively. The chain lines 119 in FIG. 3 show the envelope of the light beam impinging on the photosensors. The effect of a scratch facet in film 102 is to rotate the light beam about the scratch, as shown by the solid lines 121 in FIG. 3. When this occurs, some of the light is lost since it falls outside the photosensors, and a color shift is introduced, since for the example shown in FIG. 3, all of the red and half of the green response is lost.

In order to recapture the light that is refracted outside the optical path by a scratch facet, the optical path between the condenser lens 108 and the photosensors is surrounded by reflecting walls provided, for example, by a rectangular integrating bar 122 as shown in FIG. 4.

The unfolded optical path is shown by dotted lines in FIG. 4 and the first order reflections of the red, green, and blue photosensors are indicated by R', G', and B' respectively. Normally, in areas where no scratches are present in the film, light from the scanning beam falls directly on the red, green and blue photosensors as shown by the chain lines 119 in FIG. 4. When a scratch facet refracts the beam of light to one side, the portion of the beam refracted outside the normal beam envelope is reflected from the side walls of the integrating bar 122 and redirected onto the photosensors. An example is illustrated by the solid lines 121 in FIG. 4, where a portion of the light beam refracted by a facet of a scratch, falls directly on half of the green sensor and all of the blue sensor, and a portion of the light beam reflected from the surface of integrating bar 122, falls on all of the blue sensor and half of the green sensor. This is indicated by the portion of the beam (shown in solid lines) falling on the primed sensor areas (B' and G') in the unfolded optical schematic. A further problem arises at this point since, as shown in FIG. 4, the color response of the scanner is changed when the beam is shifted by a scratch facet in a direction that causes more light to fall on one sensor and less light to fall on another. In the example shown in FIG. 4, the blue response to doubled, the green response remains the same, and the red response is lost, leaving a net color shift from red toward blue. Although the scratch is properly exposed, a severe color distortion results.

The present invention was completed by tailoring the condenser lens 108 so that the linear dimensions of the image of the rectangular aperture 106 were twice (or any even whole number multiple) the corresponding dimensions of the end face of the integrating bar. FIG. 5 shows this final configuration. The chain lines 119 in FIG. 5 represent an unrefracted beam and, as can be seen in the unfolded optical diagram, the response of the sensors to the unrefracted beam is $\frac{1}{2}G' + R' + R + G + B + B' + \frac{1}{2}G' = 2G + 2R + 2B$. The response of the sensors to a beam refracted by the presence of a scratch facet, is shown for example by the solid lines 121 to be $\frac{1}{2}G + B + B' + G' + R' + R'' + \frac{1}{2}G'' = 2G + 2R + 2B$. This is the same response as for the unrefracted beam. Consequently, there is no color shift in the suppressed scratch.

A color balanced scratch suppressing projection apparatus according to the present invention therefore includes an objective lens having a rectangular aperture and defining first and second conjugate planes. An integrating bar having a rectangular cross section and first and second end faces is located with its first end face adjacent the first conjugate plane of the objective lens. A condenser lens, disposed between the first conjugate plane and the first end face of the integrating bar forms an image of the rectangular aperture on the second end face of the bar. The linear dimensions of the image of the rectangular aperture are an even whole number multiple of the corresponding dimensions of the second end face of the bar. In one embodiment of the invention, the projection apparatus is a color transparency scanner, a flying spot light source such as a CRT is located at the second conjugate plane of the objective lens, and a plurality of color photosensors are located at the second end of the integrating bar.

The scratch suppressing optical arrangement can be used in the reverse direction in an alternative embodiment in a color projection printer. In the printer, a photosensitive print medium is located at the second conjugate plane of the objective lens, and a plurality of colored light sources are located at the second end of the integrating bar.

BRIEF DESCRIPTION OF THE DRAWINGS

The invention is described with reference to the accompanying drawings, wherein:

FIG. 1 is a schematic diagram of a prior art film scanner;

FIG. 2 is a schematic cross section of a piece of film illustrating the effect of a scratch on light passing through the film;

FIG. 3 is a schematic diagram of a film scanner with area sharing photosensors, but lacking optical scratch suppressing means;

FIG. 4 is a schematic diagram of a film scanner having area-sharing photosensors and features for scratch suppression, but lacking features for avoiding color shifts in the suppressed scratches;

FIGS. 9a–c are perspective views of the integrating bars, condenser lenses, and rectangular apertures of optical arrangements according to the present invention for size 110, 135, and 16 mm films, respectively.

DESCRIPTION OF THE PREFERRED EMBODIMENTS

Figure 5:
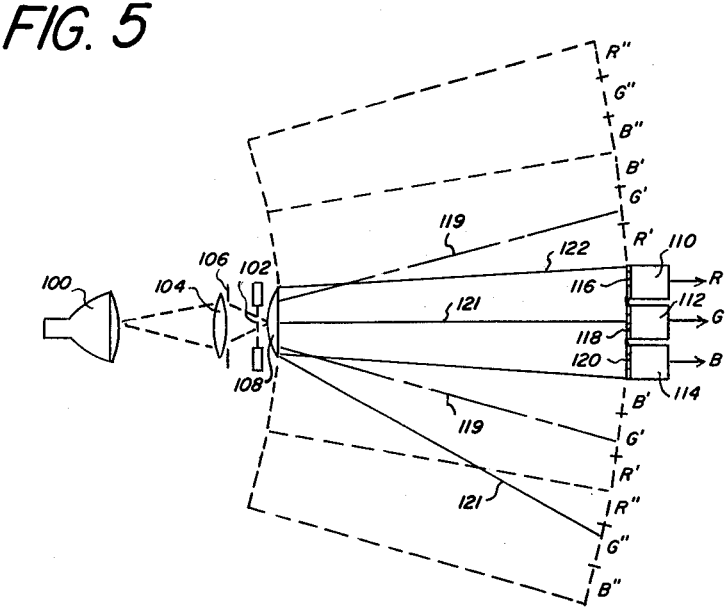
FIG. 5 is a schematic diagram of a film scanner having an optical arrangement according to the present invention having features for suppressing scratches and avoiding color shifts in the suppressed scratches.
Figure 6:
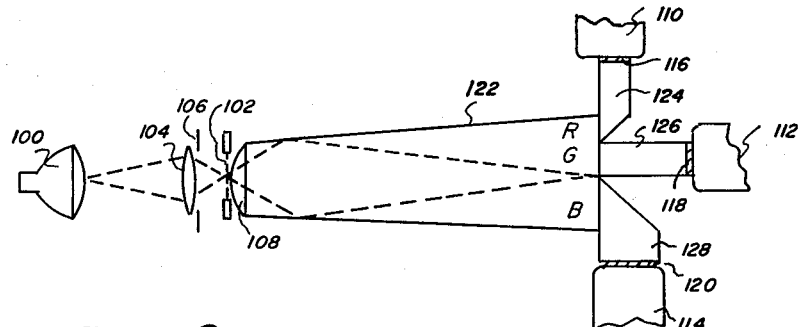
FIG. 6 is a schematic diagram of a film scanner having an optical arrangement according to the present invention, with unequal area-sharing photosensors.

Referring now to FIG. 6, a preferred embodiment of the color balanced scratch suppressing projection apparatus according to the present invention is shown in use as a film scanner. A raster pattern generated by a CRT 100 is focused on a transparency 102 by an objective lens 104. The objective lens has a rectangular aperture 106. An image of the rectangular aperture 106 is formed by condenser lens 108 on the far end of an integrating bar 122 having a rectangular cross section. The linear dimensions of the image of the rectangular aperture are twice the corresponding dimensions of the far end of the integrating bar. The far end of the integrating bar is divided into a plurality of color regions R, G, and B, and the light from these regions is conducted to a plurality of photomultiplier tubes (partially shown) 110, 112 and 114 respectively by a plurality of prism blocks 124, 126 and 128. The light incident on the photomultiplier tubes is filtered by red, green and blue filters 116, 118 and 120.

Since the blue response of most photosensors is lower than the red or green response, the area of the end of the integrating bar assigned to the blue region is twice as large as either the red or green region.

In operation, when the raster beam scans a facet of a scratch, the light refracted by the scratch facet will be reflected back into the photosensors by the integrating bar 122. The color balance of the scratch will not be shifted, since the same quantity of light still falls on each sensor, due to the selection of the magnification of the condenser lens 108 to form an image of the objective aperture having linear dimensions that are an even whole number multiple of the corresponding dimensions of the photosensing area at the end of the integrating bar.

Figure 7:
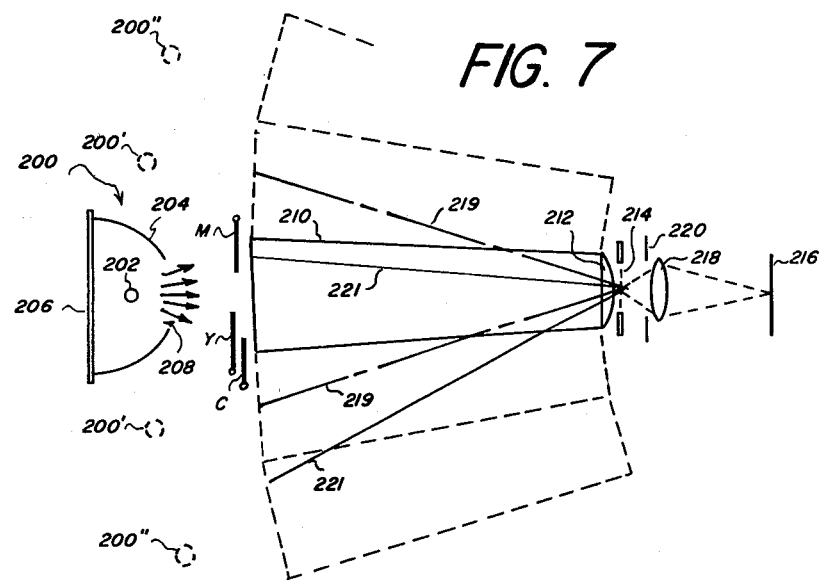
FIG. 7 is a schematic cross sectional view showing the unfolded optical path of a subtractive color printer having a color balanced scratch suppressing optical arrangement according to the present invention.

This color balanced scratch suppressing projection apparatus may be employed to equal affect in a projection type printer. FIG. 7 shows in cross section, the unfolded optical path of a subtractive type color projection printer employing a color balanced scratch suppressing optical arrangement according to the present invention. A light source generally designated 200, includes a high intensity lamp 202, an ellipsoidal reflector 204, and a cold mirror 206. Light from the lamp 202 exits the reflector 204 through an aperture 208. Some of the light is filtered by cyan, magenta and yellow subtractive filters (C, M, and Y respectively), which can be adjusted in and out of the light beam to tailor the color balance of the light source. The filtered light from the light source is incident on the end of an integrating bar 210, forming, in effect, a plurality of color regions analogous to the plurality of color regions at the end of the integrating bar in the film scanner embodiment. The light is transmitted by the integrating bar 210 and a condensor lens 212 to illuminate a transparency 214. The reflective sides of the integrating bar cause the light source to appear to the transparency as a plurality of light sources distributed in a pattern about light source 200 as shown in phantom in FIG. 7. The once reflected images of the light source are indicated by primes (') and the twice reflected images by double primes (''). An image of the color transparency 214 is formed on a paper plane 216 by an objective lens 218 having a rectangular aperture 220. The condenser lens 212 is adapted to form an image of the rectangular aperture 220 of objective lens 218 on the far end of the integrating bar 210. The linear dimensions of the image of the rectangular aperture are twice the corresponding dimension of the end face of the integrating bar. In areas of the transparency where there are no scratches, the transparency is illuminated by light source 200 and by portions of two first order reflections 200' such that the film appears to be illuminated by light from each color region on the end of the integrating bar exactly twice. This illumination is shown by chain lines 219 in FIG. 7. The illumination of a scratch facet appears to be shifted as shown by the solid lines 221 in FIG. 7. The facet is apparently illuminated by portions of unreflected, once reflected and twice reflected light from the light source 200. However, just as before, each color region at the end of the integrating bar is represented exactly twice so that no color shifts occur in the area of the suppressed scratch.

Figure 8:
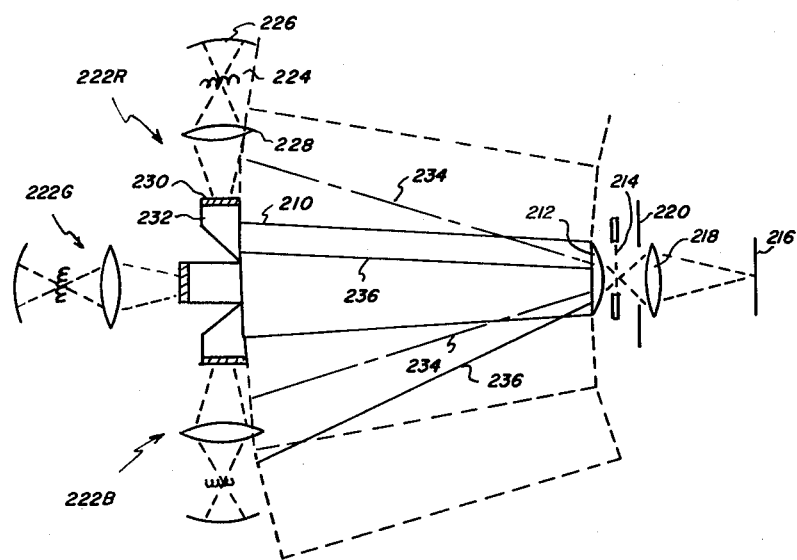
FIG. 8 is a schematic cross sectional view showing the unfolded optical path of an additive color printer having a color balanced scratch suppressing optical arrangement according to the present invention.

FIG. 8 shows a cross section of the unfolded optical path of an additive color printer with a color balanced scratch suppressing optical arrangement according to the present invention. In the additive printer, there are three colored light sources, generally designated 222 R, 222 G, and 222 B. Each light source 222 includes a lamp 224, a reflector 226, a condenser lens 228, and a color filter 230. The light from the respective light sources is transmitted to the end of an integrating bar 210, having a rectangular cross section, by a prism block 232, resulting in red, green and blue color regions being defined at the end of integrating bar 210. As in the example described above, light from the light sources illuminates a transparency 214 through a condenser lens 212. An objective lens 218 with a rectangular aperture 220 forms an image of the illuminated transparency on a photographic paper plane 216. The condenser lens 212 forms an image of aperture 220 on the end of the integrating bar 210. The linear dimensions of the image of the rectangular aperture are twice the corresponding dimensions of the end face of the integrating bar.

In operation, in areas where there are no scratches, each portion of the film appears to be illuminated by the unreflected light sources and portions of the once reflected images of the light sources, as shown by chain lines 234 in FIG. 8. In areas where a scratch occurs, as shown in FIG. 8 by solid lines 236, the apparent source of illumination is shifted, but each facet still is illuminated by the same proportional quantities of colored light, thereby avoiding any color shift in the suppressed scratch.

FIGS. 9a–c show the relative sizes and general shapes of the objective apertures 220, condenser lenses 212 and integrating bars 210 for a trio of popular film formats, size 110, 135, and 16 mm, respectively. Table I lists the dimensions of the optical apparatus according to the present invention for the 110, 135 and 16 mm formats for a film scanner having a CRT with a 6.5" diagonal raster, or for a projection printer for making 4"×5" prints.

TABLE I

| | DIMENSION | FORMAT | | |
|---|---|---|---|---|
| | | 110mm - (FIG. 9a) | 135mm - (FIG. 9b) | 16mm - (FIG. 9c) |
| A - | Objective Aperture Diagonal | 1.21 | 1.63 | 1.00 |
| B - | Film Frame (Bar End) Width | .7 | 1.42 | .433 |
| C - | Film Frame (Bar End) Height | .5 | .94 | .354 |
| D - | Distance From Objective Aperture To Film | 2.71 | 5.37 | 1.76 |
| E - | Bar Length | 11.44 | 16.81 | 8.96 |
| F - | Bar End Height-Width | 1.2 | 1.2 | 1.2 |
| | Condenser Focal Length | 2.0 | 3.63 | 1.36 |
| | Objective Focal Length | 2.39 | 5.12 | 1.62 |

The invention has been described in detail with particular reference to preferred embodiments thereof, but it will be understood that variations and modifications can be affected within the spirit and scope of the invention.

I claim:

1. In apparatus for projecting color transparencies, a color balanced scratch suppressing optical arrangement comprising:

an objective lens having a rectangular aperture and defining first and second conjugate planes;

a rectangular light integrating bar having a first end face adjacent said first conjugate plane and a second end face;

means for defining a plurality of color regions on the second end face of said bar; and a condenser lens disposed between said first conjugate plane and said first end face of said integrating bar, said condenser lens being constructed and located with respect to said second end face to form an image of said rectangular aperture at the plane of said second end face, the linear dimensions of said image being an even multiple of the corresponding dimensions of said second end face.

2. The invention claimed in claim 1, wherein said image of said rectangular aperture is twice the dimension of said end face.

3. The invention claimed in claim 1, wherein said integrating bar is tapered to define a small end and a large end on said bar and wherein said first end face is said small end and said second end face is said large end.

4. The inventions claimed in claims 1, 2, or 3, wherein said projection apparatus is a film scanner and further comprises a means for generating a raster pattern located at said second conjugate plane and a plurality of color photosensors located at said second end face.

5. The invention claimed in claim 4, wherein said second end face is divided into three color regions representing red, green and blue.

6. The invention claimed in claim 5, wherein said blue region is larger than said red or green regions.

7. The inventions claimed in claims 1, 2, or 3, wherein said projection apparatus is a projection printer and further comprises a photographic paper holder located at said second conjugate plane, and a light source defining a plurality of colored regions located at said second end face.

8. The invention claimed in claim 7, wherein said light source is a subtractive white light source with cyan, magenta and yellow filters.

9. The invention claimed in claim 7, wherein said light source is an additive light source comprising separate red, green and blue light sources.

* * * * *